(12) United States Patent
Ono et al.

(10) Patent No.: US 12,264,917 B2
(45) Date of Patent: Apr. 1, 2025

(54) ATTITUDE ANGLE DERIVATION DEVICE AND ATTITUDE ANGLE SENSOR

(71) Applicant: KABUSHIKI KAISHA TOSHIBA, Tokyo (JP)

(72) Inventors: Daiki Ono, Kanagawa (JP); Ryunosuke Gando, Kanagawa (JP); Yasushi Tomizawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 227 days.

(21) Appl. No.: 17/821,600

(22) Filed: Aug. 23, 2022

(65) Prior Publication Data
US 2023/0143243 A1     May 11, 2023

(30) Foreign Application Priority Data

Nov. 8, 2021 (JP) .................................. 2021-181568

(51) Int. Cl.
*G01C 19/5776* (2012.01)
(52) U.S. Cl.
CPC .................................. *G01C 19/5776* (2013.01)
(58) Field of Classification Search
CPC ............ G01C 19/5776; G01C 19/5733; G01C 19/5726
See application file for complete search history.

(56) References Cited

U.S. PATENT DOCUMENTS

| | | | | | |
|---|---|---|---|---|---|
| 4,134,681 A | * | 1/1979 | Elmer | ........................ | G01S 5/16 701/4 |
| 6,061,611 A | * | 5/2000 | Whitmore | .............. | B64G 1/244 244/50 |
| 6,088,653 A | * | 7/2000 | Sheikh | ..................... | G01S 19/55 701/472 |
| 6,421,622 B1 | * | 7/2002 | Horton | ................. | G01C 21/188 702/155 |
| 6,647,352 B1 | * | 11/2003 | Horton | ................. | G01C 21/188 702/151 |

(Continued)

FOREIGN PATENT DOCUMENTS

| | | |
|---|---|---|
| JP | 2016-200512 A | 12/2016 |
| JP | 2020-187018 A | 11/2020 |

OTHER PUBLICATIONS

David Titterton et al., "Strapdown Inertial Navigation Technology 2nd Edition," pp. 36-47 (Inst. of Elec. Eng. and Tech., London, UK, and Am. Inst. of Aeronautics, Reston, VA, USA 2004).

*Primary Examiner* — David J Bolduc
(74) *Attorney, Agent, or Firm* — Finnegan, Henderson, Farabow, Garrett & Dunner, LLP

(57) ABSTRACT

According to one embodiment, an attitude angle derivation device includes an acquisition part, a storage, and a processor. The acquisition part is configured to acquire a rotation angle related to a first coordinate system. The rotation angle is obtained from an angle sensor located in an object. The storage is configured to store the rotation angle and an attitude angle. The attitude angle is related to a second coordinate system of the object. The processor is configured to acquire the rotation angle and the attitude angle, update the attitude angle based on a temporal change of the rotation angle derived from the rotation angle, and output the updated attitude angle.

20 Claims, 7 Drawing Sheets

(56) References Cited

U.S. PATENT DOCUMENTS

| | | | |
|---|---|---|---|
| 6,853,947 B1* | 2/2005 | Horton | G01C 21/188 |
| | | | 702/150 |
| 8,065,074 B1* | 11/2011 | Liccardo | G01C 21/1654 |
| | | | 73/504.03 |
| 12,000,702 B2* | 6/2024 | Ceisel | E02F 9/264 |
| 2001/0014171 A1* | 8/2001 | Iijima | H04N 13/128 |
| | | | 348/E13.008 |
| 2004/0176881 A1* | 9/2004 | Shiho | B64G 1/36 |
| | | | 701/4 |
| 2006/0038718 A1* | 2/2006 | Arakane | G01C 21/1654 |
| | | | 342/357.32 |
| 2009/0015399 A1* | 1/2009 | Burneske | G08B 13/2485 |
| | | | 340/539.22 |
| 2012/0116716 A1* | 5/2012 | Lokshin | G01C 19/00 |
| | | | 702/150 |
| 2013/0238277 A1* | 9/2013 | Sasakura | G01C 19/5776 |
| | | | 702/145 |
| 2014/0202229 A1* | 7/2014 | Stanley | G01C 25/005 |
| | | | 73/1.79 |
| 2016/0298966 A1 | 10/2016 | Ikehashi et al. | |
| 2016/0337562 A1* | 11/2016 | Kang | H04N 7/183 |
| 2017/0160100 A1* | 6/2017 | Fukushima | G01C 25/00 |
| 2017/0191831 A1* | 7/2017 | Karahan | G01P 15/00 |
| 2018/0156615 A1* | 6/2018 | Maeda | G01C 21/183 |
| 2018/0224280 A1* | 8/2018 | Alam | G01C 19/5776 |
| 2018/0236352 A1* | 8/2018 | El-Sheimy | A63F 13/428 |
| 2019/0033076 A1* | 1/2019 | Budin | G01C 19/5776 |
| 2019/0113342 A1* | 4/2019 | Kondoh | G01C 19/5776 |
| 2019/0129042 A1* | 5/2019 | Yanagisawa | B60G 17/019 |
| 2020/0033129 A1* | 1/2020 | Wu | G01C 21/18 |
| 2020/0363205 A1 | 11/2020 | Gando et al. | |
| 2021/0404811 A1* | 12/2021 | Wu | G01C 21/16 |
| 2022/0252399 A1* | 8/2022 | Terao | G01P 21/00 |

* cited by examiner

ATTITUDE ANGLE DERIVATION DEVICE AND ATTITUDE ANGLE SENSOR

CROSS-REFERENCE TO RELATED APPLICATIONS

This application is based upon and claims the benefit of priority from Japanese Patent Application No. 2021-181568, filed on Nov. 8, 2021; the entire contents of which are incorporated herein by reference.

FIELD

Embodiments described herein relate generally to an attitude angle derivation device and an attitude angle sensor.

BACKGROUND

There is a sensor such as a gyro sensor or the like. The attitude (the attitude angle) of an object can be detected by the sensor. It is desirable to detect the attitude angle with high accuracy.

DETAILED DESCRIPTION

Figure 1:
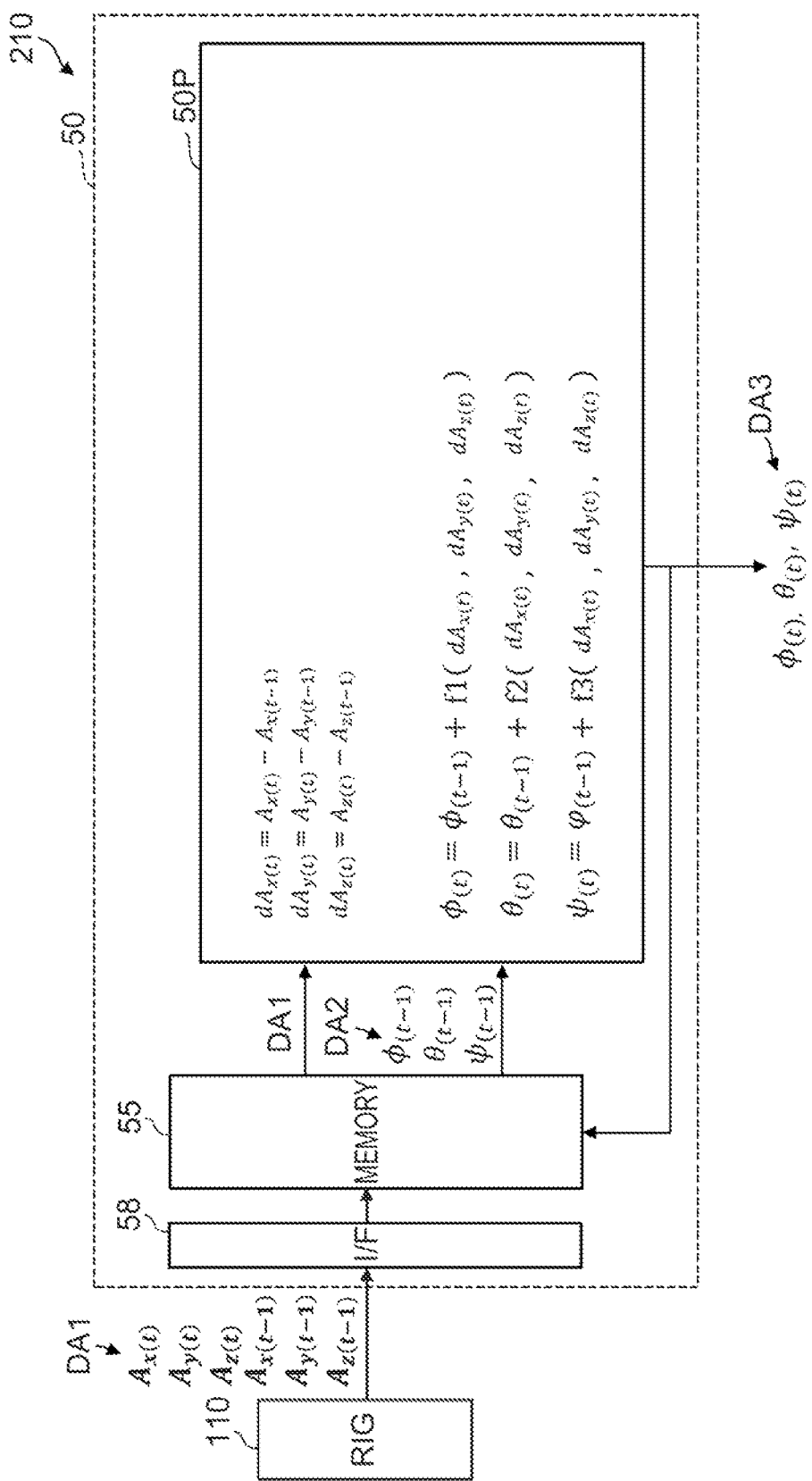
FIG. 1 is a schematic view illustrating an attitude angle derivation device according to a first embodiment.

According to one embodiment, an attitude angle derivation device includes an acquisition part, a storage, and a processor. The acquisition part is configured to acquire a rotation angle related to a first coordinate system. The rotation angle is obtained from an angle sensor located in an object. The storage is configured to store the rotation angle and an attitude angle. The attitude angle is related to a second coordinate system of the object. The processor is configured to acquire the rotation angle and the attitude angle, update the attitude angle based on a temporal change of the rotation angle derived from the rotation angle, and output the updated attitude angle.

According to one embodiment, an attitude angle sensor includes the attitude angle derivation device described above, and the angle sensor.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic view illustrating an attitude angle derivation device according to a first embodiment.

As shown in FIG. 1, the attitude angle derivation device 50 according to the embodiment includes an acquisition part 58, storage 55, and a processor 50P.

The acquisition part 58 is configured to acquire an angle (a rotation angle DA1) obtained from an angle sensor 110. The acquisition part 58 is, for example, an interface circuit (I/F).

As described below, the angle sensor 110 is located in an object. The angle sensor 110 includes, for example, an integrating gyroscope (e.g., a Rate Integrating Gyroscope (RIG)). The angle sensor 110 may be a RIG.

The rotation angle DA1 can be directly detected using the angle sensor 110. In the gyroscope of a reference example, an angular velocity is detected. The angle can be detected by integrating the detected angular velocity.

According to the embodiment, an integrating gyroscope is applied to the angle sensor 110. Thereby, for example, cumulative error of the integration does not occur. The angle sensor 110 is, for example, a three-axis angle sensor.

The angle (the rotation angle DA1) that is obtained from the angle sensor 110 is related to a first coordinate system. For example, the first coordinate system is referenced to the position at which the angle sensor 110 is located. The first coordinate system is, for example, a sensor coordinate system or a body coordinate system.

The rotation angle DA1 may include, for example, a first rotation angle $A_x$ related to a first axis, a second rotation angle $A_y$ related to a second axis, and a third rotation angle $A_z$ related to a third axis. The second axis crosses the first axis. The third axis crosses a plane including the first and second axes. For example, the first axis is an X-axis. The second axis is a Y-axis. The third axis is a Z-axis. For example, the second axis is orthogonal to the first axis. The third axis is orthogonal to the first and second axes.

The first rotation angle $A_x$ corresponds to the angle of the rotation around the first axis. The second rotation angle $A_y$ corresponds to the angle of the rotation around the second axis. The third rotation angle $A_z$ corresponds to the angle of the rotation around the third axis.

One time is taken as a first time t. The rotation angle DA1 includes the first rotation angle $A_{x(t)}$ at the first time t, the second rotation angle $A_{y(t)}$ at the first time t, and the third rotation angle $A_{z(t)}$ at the first time t. The one time before the first time t is taken as a second time (t−1). The first rotation angle $A_x$ at the second time (t−1) is taken as the first rotation angle $A_{x(t-1)}$. The second rotation angle $A_y$ at the second time (t−1) is taken as the second rotation angle $A_{y(t-1)}$. The third rotation angle $A_z$ at the second time (t−1) is taken as the third rotation angle $A_{z(t-1)}$. The rotation angle DA1 may include the first rotation angle $A_{x(t-1)}$, the second rotation angle $A_{y(t-1)}$, and the third rotation angle $A_{z(t-1)}$. The rotation angle DA1 is supplied from the angle sensor 110 to the acquisition part 58.

For example, the storage 55 is configured to store the rotation angle DA1 supplied from the acquisition part 58. The storage 55 is configured to store an attitude angle DA2 of the object in which the angle sensor 110 is located. The storage 55 is memory (or storage). The storage 55 may be buffer memory. The storage 55 is configured to store the rotation angle DA1.

The attitude angle DA2 is related to a second coordinate system of the object. The second coordinate system may be different from the first coordinate system. In one example, the second coordinate system is, for example, an absolute coordinate system. For example, the second coordinate system may be referenced to the orientation of the acceleration due to gravity. The second coordinate system may be, for example, a spatial coordinate system or a reference coordinate system. The second coordinate system may be global coordinates.

The attitude angle DA2 is, for example, a three-dimensional attitude angle. The attitude angle DA2 includes, for example, a first attitude angle $\phi$ related to the first attitude axis, a second attitude angle $\theta$ related to the second attitude axis, and a third attitude angle $\psi$ related to the third attitude axis. The second attitude axis crosses the first attitude axis. The third attitude axis crosses a plane including the first and second attitude axes. For example, the second attitude axis is orthogonal to the first attitude axis. The third attitude axis is orthogonal to the first and second attitude axes. The first to third attitude axes may be different from the first to third axes.

The first attitude angle $\phi$ corresponds to the angle of the rotation around the first attitude axis. The second attitude angle $\theta$ corresponds to the angle of the rotation around the second attitude axis. The third attitude angle $\psi$ corresponds to the angle of the rotation around the third attitude axis.

The storage 55 may store the attitude angle DA2 at the second time (t−1). The attitude angle DA2 includes the first attitude angle $\phi_{(t-1)}$ at the second time (t−1), the second attitude angle $\theta_{(t-1)}$ at the second time (t−1), and the third attitude angle $\psi_{(t-1)}$ at the second time (t−1). The attitude angle DA2 may be supplied from the storage 55 to the processor 50P.

The processor 50P acquires the rotation angle DA1 and the attitude angle DA2. For example, the rotation angle DA1 that is supplied from the acquisition part 58 to the storage 55 is acquired from the storage 55 by the processor 50P. For example, the processor 50P acquires the attitude angle DA2 from the storage 55. The processor 50P is configured to update the attitude angle DA2 based on the temporal change of the rotation angle DA1 derived from the rotation angle DA1 and output an updated attitude angle DA3.

According to the embodiment, the attitude angle DA3 is derived using the angle (the rotation angle DA1) obtained from the angle sensor 110. The attitude angle is not derived based on an angular velocity as in the reference example described above. Thereby, the error when integrating the angular velocity does not occur. According to the embodiment, the attitude angle can be derived (detected) with high accuracy. For example, the attitude angle can be quickly derived.

As described above, for example, the first rotation angle $A_{x(t)}$, the second rotation angle $A_{y(t)}$, the third rotation angle $A_{z(t)}$, the first rotation angle $A_{x(t-1)}$, the second rotation angle $A_{y(t-1)}$, and the third rotation angle $A_{z(t-1)}$ may be stored in the storage 55.

The processor 50P derives the first temporal change $dA_{x(t)}$, the second temporal change $dA_{y(t)}$, and the third temporal change $dA_{z(t)}$ as the temporal change of the rotation angle DA1.

The first temporal change $dA_{x(t)}$, the second temporal change $dA_{y(t)}$, the third temporal change $dA_{z(t)}$, the first rotation angle $A_{x(t)}$, the second rotation angle $A_{y(t)}$, the third rotation angle $A_{z(t)}$, the first rotation angle $A_{x(t-1)}$, the second rotation angle $A_{y(t-1)}$, and the third rotation angle $A_{z(t-1)}$ satisfy the following first formula.

$$dA_{x(t)} = A_{x(t)} - A_{x(t-1)}$$

$$dA_{y(t)} = A_{y(t)} - A_{y(t-1)}$$

$$dA_{z(t)} = A_{z(t)} - A_{z(t-1)} \quad (1)$$

The processor 50P derives such a temporal change.

The processor 50P updates the derived temporal change and the attitude angle DA2 of the second time (t−1) acquired from the storage 55. For example, the processor 50P derives the first attitude angle $\phi_{(t)}$ of the first time t from the sum of the first attitude angle $\phi_{(t-1)}$ at the second time (t−1) and a function $f1(dA_{x(t)}, dA_{y(t)}, dA_{z(t)})$. For example, the processor 50P derives the second attitude angle $\theta_{(t)}$ of the first time t from the sum of the second attitude angle $\theta_{(t-1)}$ at the second time (t−1) and a function $f2(dA_{x(t)}, dA_{y(t)}, dA_{z(t)})$. For example, the processor 50P derives the third attitude angle $\psi_{(t)}$ of the first time t from the sum of the third attitude angle $\psi_{(t-1)}$ at the second time (t−1) and a function $f3(dA_{x(t)}, dA_{y(t)}, dA_{z(t)})$.

Thus, according to the embodiment, the temporal change of the rotation angle DA1 is derived from the angle (the rotation angle DA1) obtained from the angle sensor 110. The attitude angle DA2 is updated based on the temporal change of the derived rotation angle DA1; and the updated attitude angle DA3 is derived. The attitude angle DA3 includes, for example, the first attitude angle $\theta_{(t)}$, the third attitude angle $\theta_{(t)}$, and the third attitude angle $\psi_{(t)}$.

Several examples of the processor 50P will now be described.

Figure 2:
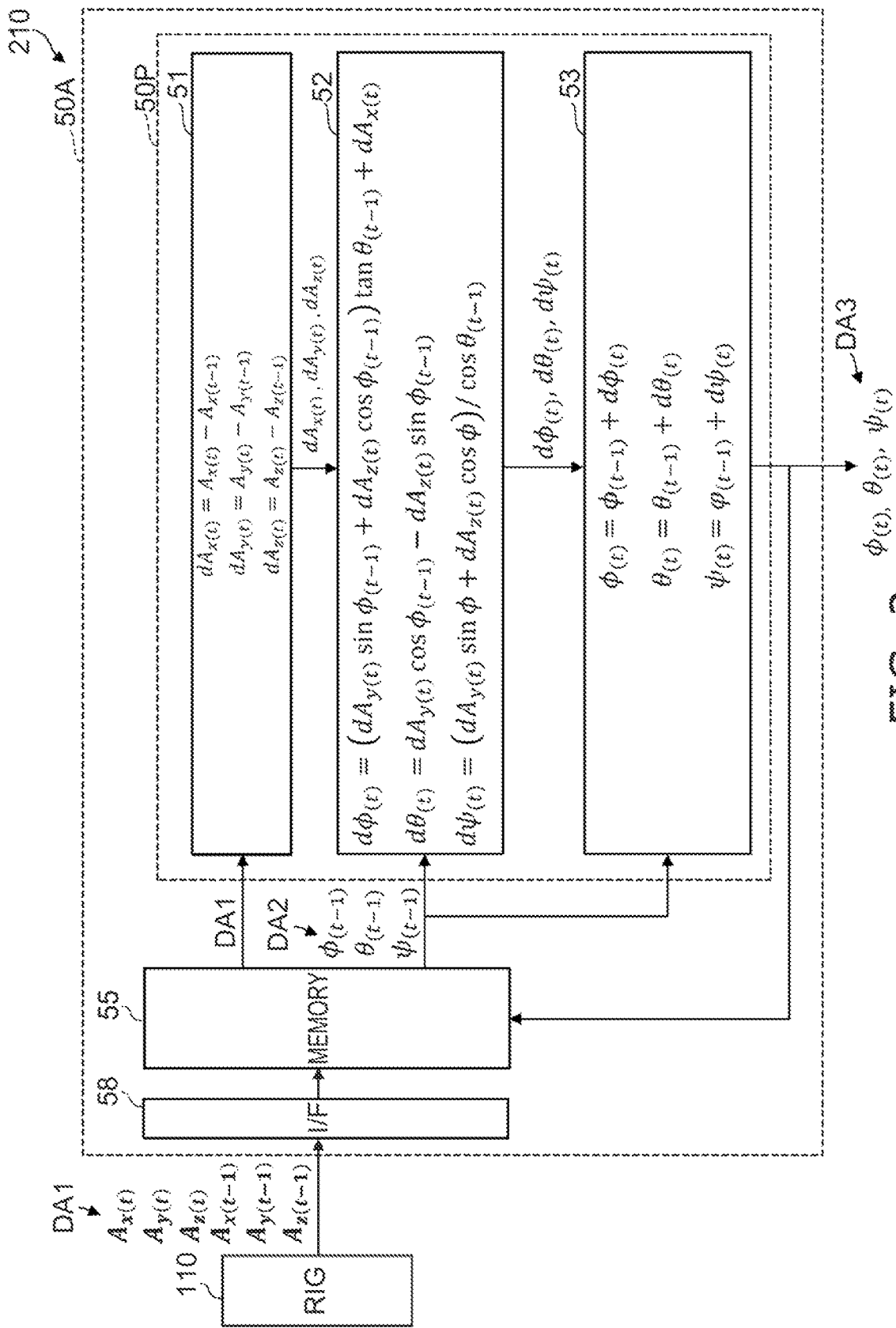
FIG. 2 is a schematic view illustrating an attitude angle derivation device according to the first embodiment.

FIG. 2 is a schematic view illustrating an attitude angle derivation device according to the first embodiment.

In the attitude angle derivation device 50A according to the embodiment as shown in FIG. 2, the processor 50P may include a first calculation part 51. The first calculation part 51 is configured to derive the temporal change of the rotation angle DA1. The first calculation part 51 performs the calculation of the first formula above.

The processor 50P may further include a second calculation part 52. The temporal change that is derived by the first calculation part 51 is supplied to the second calculation part 52. The second calculation part 52 is configured to derive the change of the attitude angle based on the temporal change derived by the first calculation part 51 and the attitude angle DA2 acquired from the storage 55.

The change of the attitude angle includes, for example, the first attitude angle change $d\phi_{(t)}$, the second attitude angle change $d\theta_{(t)}$, and the third attitude angle change $d\psi_{(t)}$. The first attitude angle change $d\phi_{(t)}$, the second attitude angle change $d\theta_{(t)}$, and the third attitude angle change $d\psi_{(t)}$ satisfy the following second formula.

$$d\theta_{(t)} = (dA_{y(t)} \sin \phi_{(t-1)} + dA_{z(t)} \cos \phi_{(t-1)}) \tan \theta_{(t-1)} + dA_{x(t)}$$

$$d\theta_{(t)} = dA_{y(t)} \cos \phi_{(t-1)} - dA_{z(t)} \sin \phi_{(t-1)}$$

$$d\phi_{(t)} = (dA_{y(t)} \sin \phi + dA_{z(t)} \cos \phi)/\cos \theta_{(t-1)} \quad (2)$$

The processor 50P may further include a third calculation part 53. The change of the attitude angle derived by the second calculation part 52 is supplied to the third calculation part 53. The third calculation part 53 is configured to derive the updated attitude angle DA3 by adding the change of the attitude angle derived by the second calculation part 52 and the attitude angle DA2 acquired from the storage 55.

For example, the calculation of the following third formula is performed in the third calculation part 53.

$$\phi_{(t)}=\phi_{(t-1)}+d\phi_{(t)}$$

$$\theta_{(t)}=\theta_{(t-1)}+d\theta_{(t)}$$

$$\psi_{(t)}=\psi_{(t-1)}+d\psi_{(t)} \quad (3)$$

Thus, the processor 50P (e.g., the third calculation part 53) is configured to derive, as the updated attitude angle DA3, the first attitude angle $\phi_{(t)}$ at the first time t, the second attitude angle $\theta_{(t)}$ at the first time t, and the third attitude angle $\psi_{(t)}$ at the first time t. The first attitude angle $\phi_{(t)}$, the second attitude angle $\theta_{(t)}$, and the third attitude angle $\psi_{(t)}$ satisfy the third formula above. The result of the calculation of the third formula corresponds to the attitude angle DA3 to be derived.

According to the embodiment, the processor 50P (e.g., the third calculation part 53) may supply the updated attitude angle DA3 to the storage 55. The storage 55 is configured to store the updated attitude angle DA3. The processing described above may be repeatedly performed. The attitude angle at any subsequent time may be derived using the updated attitude angle DA3.

Euler angles may be used in the embodiment as described above. Quaternions are applicable as the attitude angle in the embodiment as follows.

For example, the attitude angle DA2 can be represented by a first quaternion value $\alpha$, a second quaternion value $\beta$, a third quaternion value $\gamma$, and a fourth quaternion value $\delta$. For example, the attitude angle DA2 includes the first quaternion value $\alpha$, the second quaternion value $\beta$, the third quaternion value $\gamma$, and the fourth quaternion value $\delta$.

Figure 3:
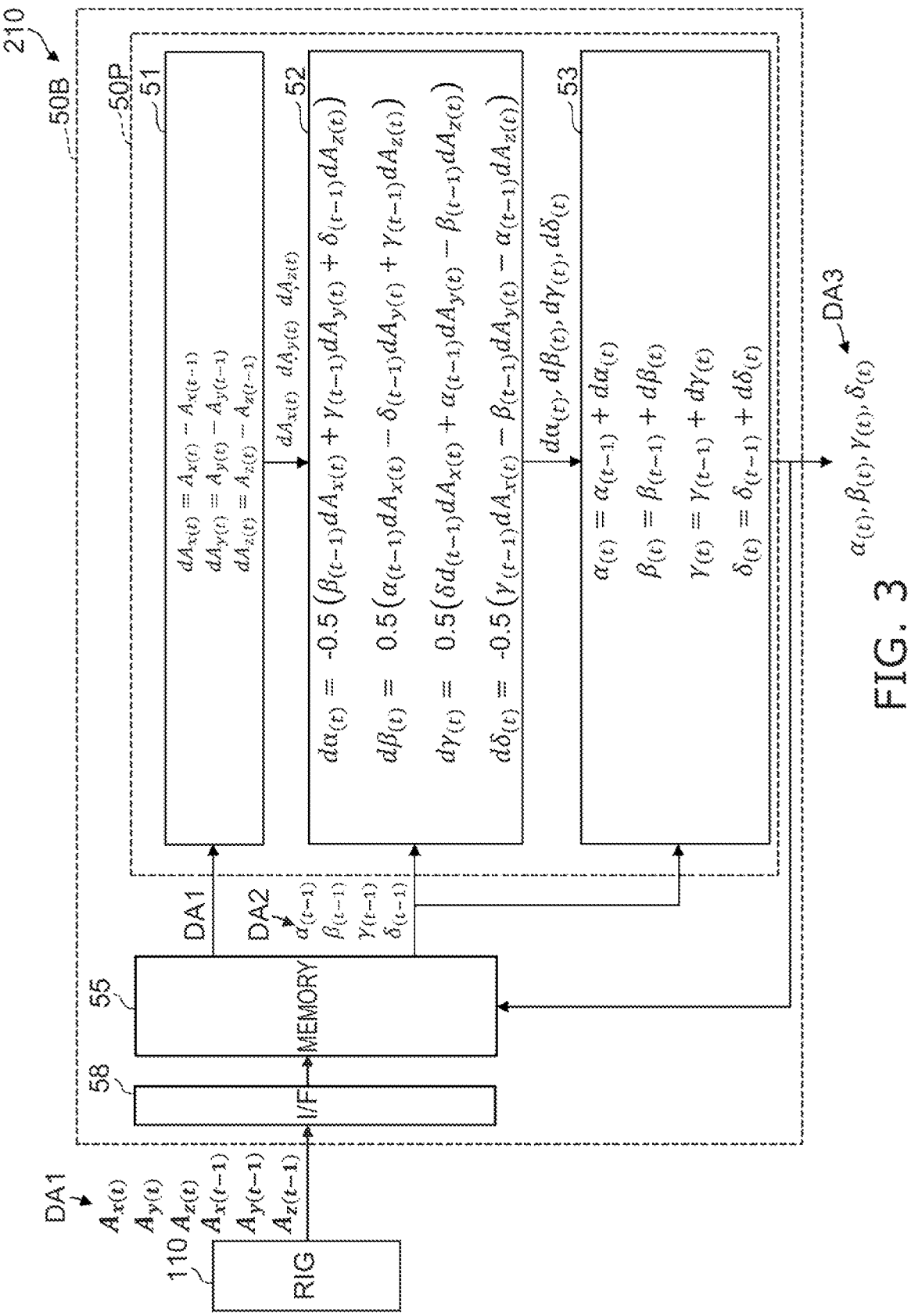
FIG. 3 is a schematic view illustrating an attitude angle derivation device according to the first embodiment.

FIG. 3 is a schematic view illustrating an attitude angle derivation device according to the first embodiment.

In the attitude angle derivation device 50B according to the embodiment as shown in FIG. 3, the processor 50P includes the first to third calculation parts 51 to 53. A calculation similar to the calculation described above is performed in the first calculation part 51.

The attitude angle DA2 includes the first quaternion value $\alpha_{(t-1)}$ at the second time (t−1), the second quaternion value $\beta_{(t-1)}$ at the second time (t−1), the third quaternion value $\gamma_{(t-1)}$ at the second time (t−1), and the fourth quaternion value $\delta_{(t-1)}$ at the second time (t−1). These quaternion values are supplied to the processor 50P (the second calculation part 52 and the third calculation part 53).

The processor 50P (the second calculation part 52) derives the first quaternion value change $d\alpha_{(t)}$, the second quaternion value change $d\beta_{(t)}$, the third quaternion value change $d\gamma_{(t)}$, and the fourth quaternion value change $d\delta_{(t)}$ as the change of the attitude angle DA2.

The first quaternion value change $d\alpha_{(t)}$, the second quaternion value change $d\beta_{(t)}$, the third quaternion value change $d\gamma_{(t)}$, and the fourth quaternion value change $d\delta_{(t)}$ satisfy the following fourth formula.

$$d\alpha_{(t)}=-0.5(\beta_{(t-1)}dA_{x(t)}+\gamma_{(t-1)}dA_{y(t)}+\delta_{(t-1)}dA_{z(t)})$$

$$d\beta_{(t)}=0.5(\alpha_{(t-1)}dA_{x(t)}-\delta_{(t-1)}dA_{y(t)}+\gamma_{(t-1)}dA_{z(t)})$$

$$d\gamma_{(t)}=0.5(\delta_{(t-1)}dA_{x(t)}+\alpha_{(t-1)}dA_{y(t)}-\beta_{(t-1)}dA_{z(t)})$$

$$d\delta_{(t)}=-0.5(\gamma_{(t-1)}dA_{x(t)}-\beta_{(t-1)}dA_{y(t)}-\alpha_{(t-1)}dA_{z(t)}) \quad (4)$$

For example, the second calculation part 52 performs the calculation of the fourth formula above by using the temporal change of the rotation angle (the first temporal change $dA_{x(t)}$, the second temporal change $dA_{y(t)}$, and the third temporal change $dA_{z(t)}$) and the attitude angle DA2 acquired from the storage 55.

The processor 50P (the third calculation part 53) derives the first quaternion value $\alpha_{(t)}$ at the first time t, the second quaternion value $\beta_{(t)}$ at the first time t, the third quaternion value $\gamma_{(t)}$ at the first time t, and the fourth quaternion value $\delta_{(t)}$ at the first time t as the updated attitude angle DA3.

The first quaternion value $\alpha_{(t)}$ at the first time t, the second quaternion value $\beta_{(t)}$ at the first time t, the third quaternion value $\gamma_{(t)}$ at the first time t, and the fourth quaternion value $\delta_{(t)}$ at the first time t satisfy the following fifth formula.

$$\alpha_{(t)}=\alpha_{(t-1)}+d\alpha_{(t)}$$

$$\beta_{(t)}=\beta_{(t-1)}+d\beta_{(t)}$$

$$\gamma_{(t)}=\gamma_{(t-1)}+d\gamma_{(t)}$$

$$\delta_{(t)}=\delta_{(t-1)}+d\delta_{(t)} \quad (5)$$

The calculation of the fifth formula above is performed in the third calculation part 53; and the first quaternion value $\alpha_{(t)}$, the second quaternion value $\beta_{(t)}$, the third quaternion value $\gamma_{(t)}$, and the fourth quaternion value $\delta_{(t)}$ are derived as the updated attitude angle DA3.

The quaternion values may be transformed into Euler angles as described below.

Figure 4:
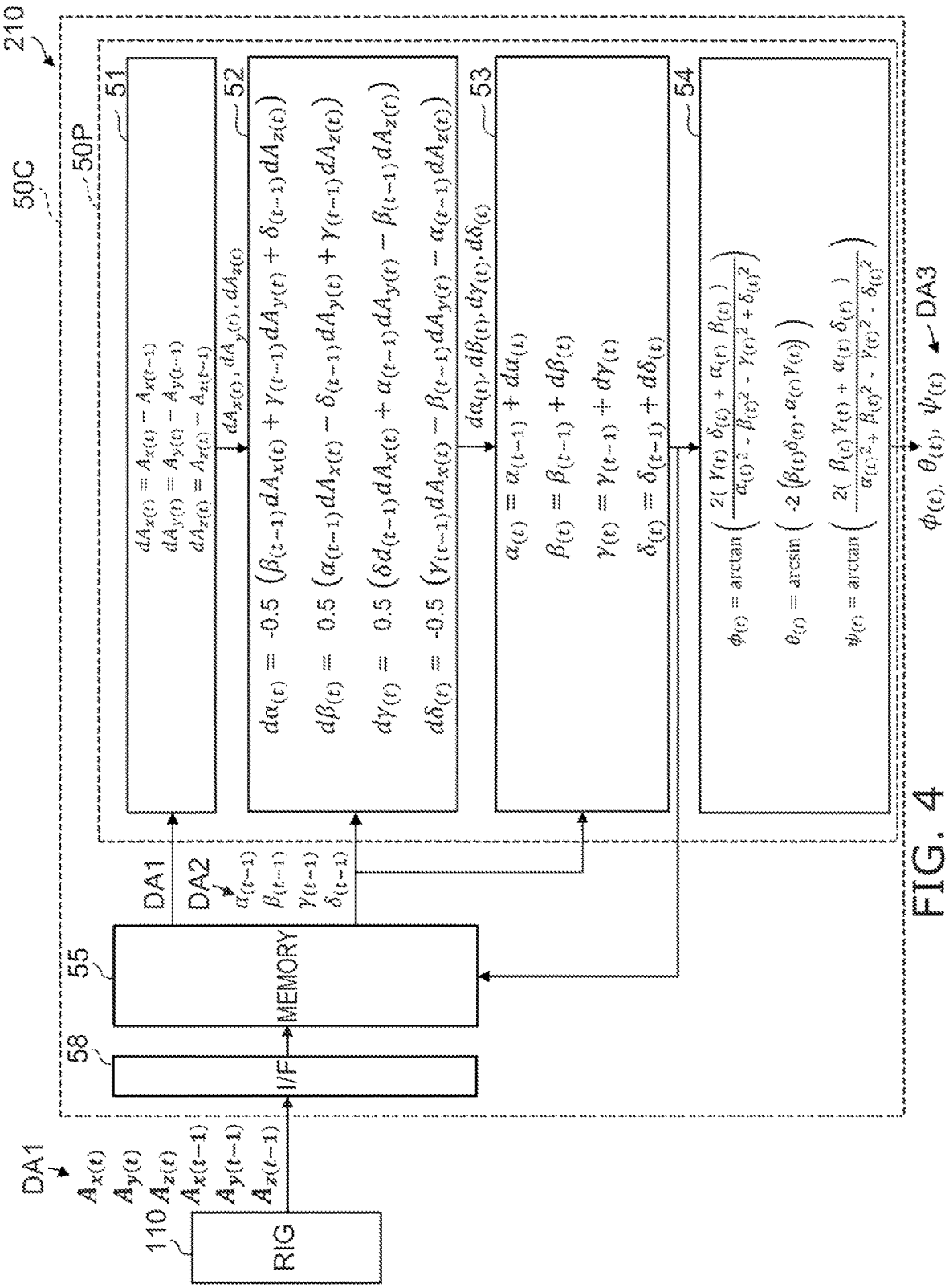
FIG. 4 is a schematic view illustrating an attitude angle derivation device according to the first embodiment.

FIG. 4 is a schematic view illustrating an attitude angle derivation device according to the first embodiment.

In the attitude angle derivation device 50C according to the embodiment as shown in FIG. 4, the processor 50P includes a fourth calculation part 54. Otherwise, the configuration of the attitude angle derivation device 50C may be similar to that of the attitude angle derivation device 50B.

In the attitude angle derivation device 50C, the processor 50P (the fourth calculation part 54) derives, as the updated attitude angle DA3, the first attitude angle $\phi_{(t)}$ at the first time t, the second attitude angle $\theta_{(t)}$ at the first time t, and the third attitude angle $\psi_{(t)}$ at the first time t based on the first quaternion value $\alpha_{(t)}$ at the first time t, the second quaternion value $\beta_{(t)}$ at the first time t, the third quaternion value $\gamma_{(t)}$ at the first time t, and the fourth quaternion value $\delta_{(t)}$ at the first time t.

The first attitude angle $\phi_{(t)}$ at the first time t, the second attitude angle $\theta_{(t)}$ at the first time t, and the third attitude angle $\psi_{(t)}$ at the first time t satisfy the following sixth formula.

$$\phi_{(t)} = \arctan\left(\frac{2(\gamma_{(t)}\delta_{(t)} + \alpha_{(t)}\beta_{(t)})}{\alpha_{(t)}^2 - \beta_{(t)}^2 - \gamma_{(t)}^2 + \delta_{(t)}^2}\right)$$

$$\theta_{(t)} = \arcsin(-2(\beta_{(t)}\delta_{(t)} - \alpha_{(t)}\gamma_{(t)}))$$

$$\psi_{(t)} = \arctan\left(\frac{2(\beta_{(t)}\gamma_{(t)} + \alpha_{(t)}\delta_{(t)})}{\alpha_{(t)}^2 + \beta_{(t)}^2 - \gamma_{(t)}^2 - \delta_{(t)}^2}\right) \quad (6)$$

For example, the calculation of the sixth formula above is performed by the fourth calculation part 54. Thereby, the quaternion values are transformed into Euler angles.

According to the embodiment, for example, a digital arithmetic device is applicable as the processor 50P. According to the embodiment, at least a part of the processor 50P may include an analog circuit. According to the embodiment, the configuration of the processor 50P is arbitrary.

According to the embodiment, the updated attitude angle DA3 may be output via the acquisition part 58 (e.g., an interface). The acquisition part 58 may function as an output part.

Second Embodiment

An attitude angle sensor 210 according to a second embodiment (see FIGS. 1 to 4) includes the angle sensor 110 and the attitude angle derivation device (the attitude angle derivation devices 50 to 50C, etc.) according to the embodiment. According to the attitude angle sensor 210 according to the embodiment, an attitude angle sensor that can detect an attitude angle with high accuracy can be provided.

An example of the angle sensor 110 will now be described.

Figure 5:
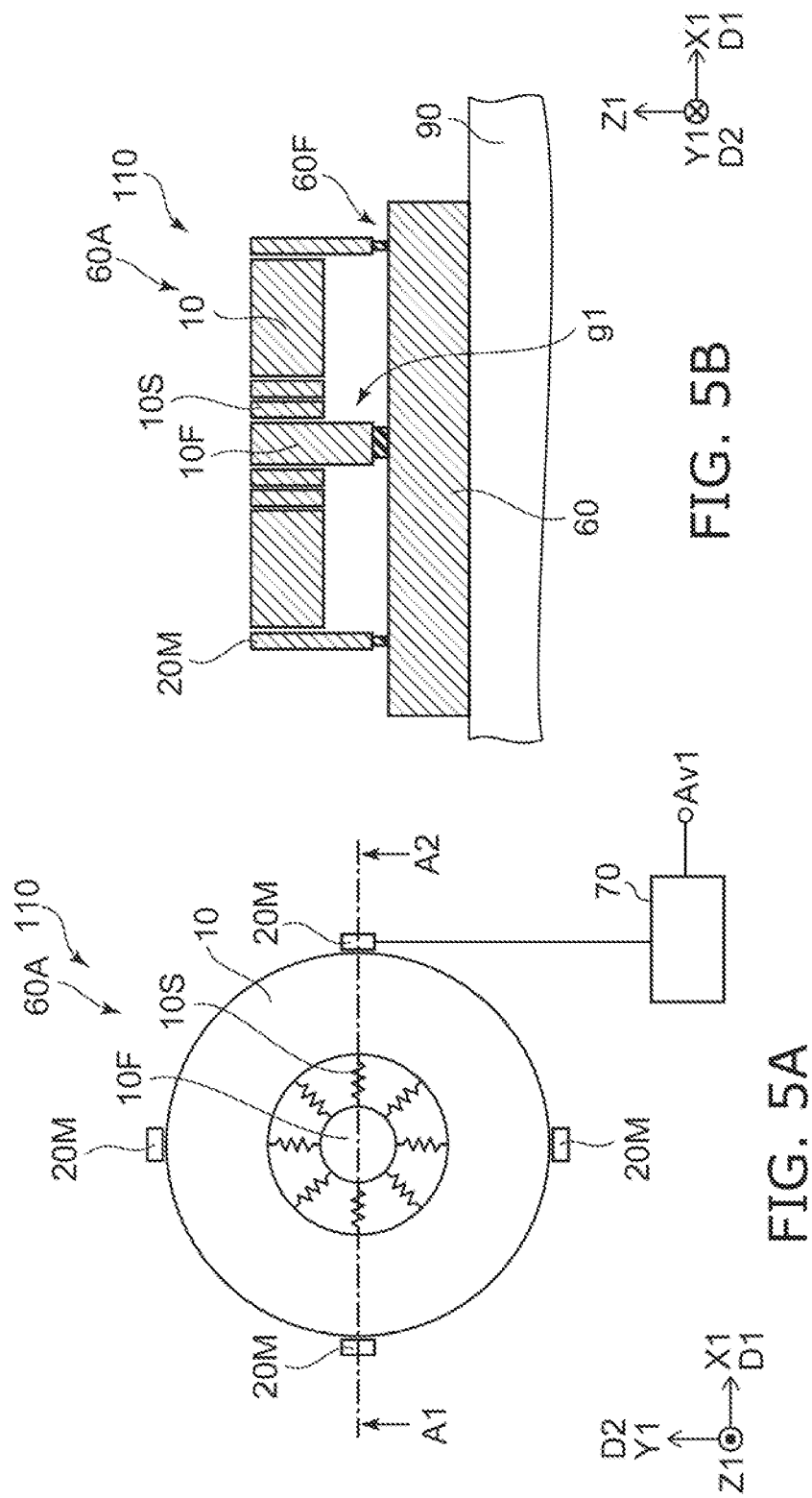
FIGS. 5A and 5B are schematic views illustrating a sensor according to the embodiment.

FIGS. 5A and 5B are schematic views illustrating a sensor according to the embodiment.

FIG. 5A is a plan view. FIG. 5B is a line A1-A2 cross-sectional view of FIG. 5A. As shown in FIGS. 5A and 5B, the angle sensor 110 according to the embodiment includes a base body 60, a structure body 60A, and a control device 70. The angle sensor 110 is located in an object 90. For example, the angle sensor 110 is fixed to the object 90.

The base body 60 includes a first surface 60F. The structure body 60A is, for example, a RIG.

The structure body 60A includes a movable member 10. The movable member 10 can vibrate. The vibration of the movable member 10 includes a first component and a second component. The first component is along a first direction D1. The second component is along a second direction D2. The first direction D1 is along the first surface 60F. The second direction D2 crosses the first direction D1 and is along the first surface 60F.

The first surface 60F is taken as an X1-Y1 plane. One direction in the X1-Y1 plane is taken as an X1-axis direction. A direction perpendicular to the X1-axis direction along the X1-Y1 plane is taken as a Y1-axis direction. A direction perpendicular to the X1-axis direction and the Y1-axis direction is taken as a Z1-axis direction. The first direction D1 is, for example, the X1-axis direction. The second direction D2 is, for example, the Y1-axis direction.

The control device 70 is configured to output a rotation angle Av1 of the movable member 10 obtained based on the first and second components.

For example, the control device 70 detects the amplitude of the first component and the amplitude of the second component of the vibration of the movable member 10. The ratio of these amplitudes corresponds to the rotation angle Av1.

As shown in FIGS. 5A and 5B, the structure body 60A includes, for example, a fixed part 10F and a connection part 10S. The fixed part 10F is fixed to the base body 60. The connection part 10S is supported by the fixed part 10F. The connection part 10S is connected with the movable member 10. In the example, the movable member 10 is located around the fixed part 10F in the X1-Y1 plane. The movable member 10 is ring-shaped. The movable member 10 is supported by the multiple connection parts 10S. A gap g1 is provided between the movable member 10 and the base body 60. For example, the connection part 10S has a bent shape. For example, the connection part 10S may have a meandering shape. The connection part 10S is, for example, a spring structure body. The connection part 10S is deformable.

For example, the movable member 10 and the connection part 10S are conductive.

As shown in FIGS. 5A and 5B, for example, the structure body 60A includes a first counter electrode member 20M. In the example, multiple first counter electrode members 20M are included. The vibration of the movable member 10 may be controlled by the multiple first counter electrode members 20M. The vibration of the movable member 10 may be controlled by a voltage (e.g., a voltage including an AC component) applied to the first counter electrode member 20M. For example, the voltage is applied between the first counter electrode member 20M and the movable member 10.

The vibration state changes when the vibrating movable member 10 is rotated by an external force, etc. It is considered that the change of the vibration state is due to, for example, an action of a Coriolis force. For example, the movable member 10 vibrates via a spring mechanism (e.g., the connection part 10S). A Coriolis force due to an angular velocity Ω of rotation acts on the movable member 10 vibrating in the first direction D1. Thereby, a component of a vibration along the second direction D2 is generated in the movable member 10. The control device 70 detects the amplitude of the vibration along the second direction D2. On the other hand, a Coriolis force due to the angular velocity Ω of rotation acts on the movable member 10 vibrating in the second direction D2. Thereby, a component of a vibration along the first direction D1 is generated in the movable member 10. The control device 70 detects the amplitude of the vibration along the first direction D1. For example, the rotation angle corresponds to $\tan^{-1}(-A2/A1)$, where "A1" is the amplitude of the first component of the first direction D1, and "A2" is the amplitude of the second component of the second direction D2.

The rotation angle (e.g., the rotation angle Av1) is obtained by such an angle sensor 110. The rotation angle DA1 illustrated in FIG. 1, etc., is obtained by determining the rotation angle for the different multiple axes.

According to the embodiment, for example, instead of using the angular velocity, the rotation angle (the angle) is input as-is to the attitude angle derivation device. The attitude angle can be derived thereby. For example, in a reference example that uses the angular velocity, high-frequency noise or drift due to the integral error is easily generated. According to the embodiment, the drift or high-frequency noise is suppressed, and the attitude angle can be detected with high accuracy.

According to the embodiment, temporal information is unnecessary to derive the attitude angle. Thereby, the attitude angle can be detected with high accuracy even by irregular sampling.

Third Embodiment

A third embodiment relates to an electronic device. The electronic device may be, for example, at least a part of the object 90.

Figure 6:
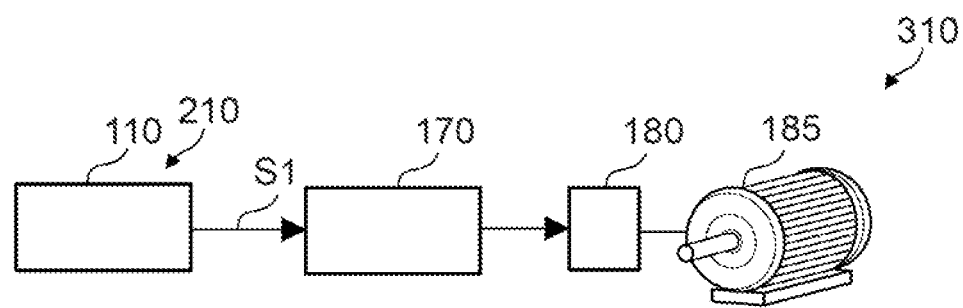
FIG. 6 is a schematic view illustrating the electronic device according to a third embodiment.

FIG. 6 is a schematic view illustrating the electronic device according to the third embodiment.

As shown in FIG. 6, the electronic device 310 according to the embodiment includes a circuit controller 170 and a sensor according to an embodiment. In the example of FIG. 6, the attitude angle sensor 210 (and the angle sensor 110) are illustrated as the sensor. The circuit controller 170 is configured to control a circuit 180 based on a signal S1 obtained from the sensor. The circuit 180 is, for example, a control circuit of a drive device 185, etc. According to the embodiment, the circuit 180 for controlling the drive device 185, etc., can be controlled with high accuracy based on a highly-accurate detection result.

FIGS. 7A to 7H are schematic views illustrating applications of the electronic device.

Figure 7A:
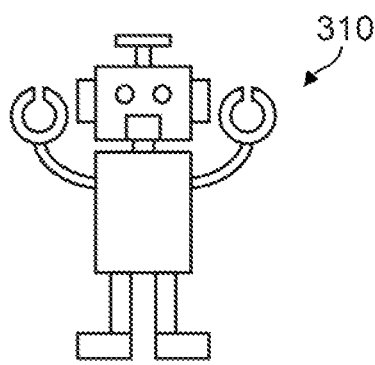
FIGS. 7A to 7H are schematic views illustrating applications of the electronic device.
Figure 7B:
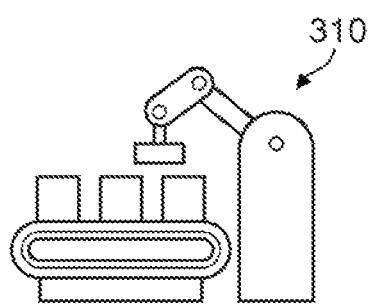
Figure 7C:
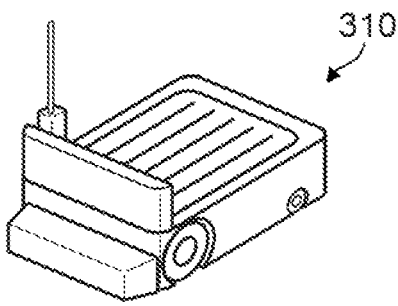
Figure 7D:
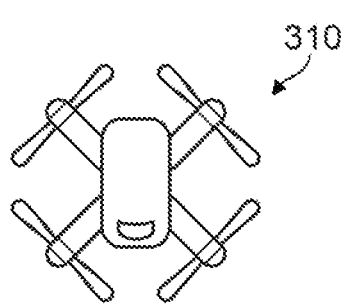
Figure 7E:
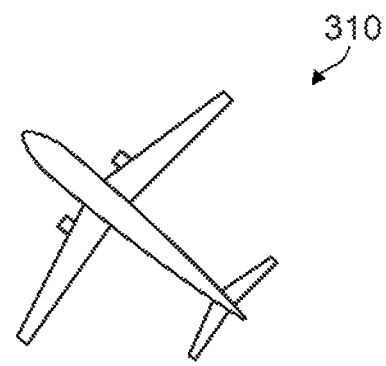
Figure 7F:
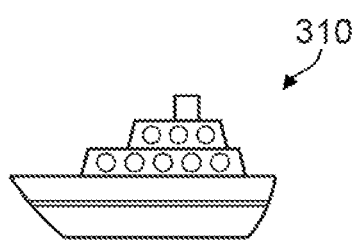
Figure 7G:
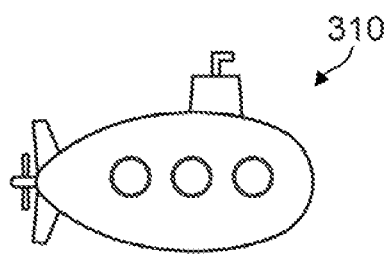
Figure 7H:

As shown in FIG. 7A, the electronic device 310 may be at least a part of a robot. As shown in FIG. 7B, the electronic device 310 may be at least a part of a machining robot provided in a manufacturing plant, etc. As shown in FIG. 7C, the electronic device 310 may be at least a part of an automatic guided vehicle inside a plant, etc. As shown in FIG. 7D, the electronic device 310 may be at least a part of a drone (an unmanned aircraft). As shown in FIG. 7E, the electronic device 310 may be at least a part of an airplane. As shown in FIG. 7F, the electronic device 310 may be at least a part of a ship. As shown in FIG. 7G, the electronic device 310 may be at least a part of a submarine. As shown in FIG. 7H, the electronic device 310 may be at least a part of an automobile. The electronic device 310 may include, for example, at least one of a robot or a mobile body.

Embodiments may include the following configurations (e.g., technological proposals).

Configuration 1

An attitude angle derivation device, comprising:
an acquisition part configured to acquire a rotation angle related to a first coordinate system, the rotation angle being obtained from an angle sensor located in an object;
a storage configured to store the rotation angle and an attitude angle, the attitude angle being related to a second coordinate system of the object; and
a processor configured to acquire the rotation angle and the attitude angle, update the attitude angle based on a temporal change of the rotation angle derived from the rotation angle, and output the updated attitude angle.

Configuration 2

The attitude angle derivation device according to Configuration 1, wherein
the angle sensor includes an integrating gyroscope.

Configuration 3

The attitude angle derivation device according to Configuration 1 or 2, wherein
the angle sensor includes a movable member,
the movable member can vibrate,
the vibration of the movable member includes:
a first component along a first direction; and
a second component along a second direction crossing the first direction, and
the angle sensor is configured to output, as the rotation angle, a rotation angle of the movable member obtained based on the first and second components.

Configuration 4

The attitude angle derivation device according to any one of Configurations 1 to 3, wherein,
the processor includes a first calculation part, and
the first calculation part is configured to derive the temporal change of the rotation angle.

Configuration 5

The attitude angle derivation device according to Configuration 4, wherein
the processor further includes a second calculation part, and
the second calculation part is configured to derive a change of the attitude angle based on the temporal change derived by the first calculation part and based on the attitude angle acquired from the storage.

Configuration 6

The attitude angle derivation device according to Configuration 5, wherein
the processor further includes a third calculation part, and
the third calculation part is configured to derive the updated attitude angle by adding:
the change of the attitude angle derived by the second calculation part; and
the attitude angle acquired from the storage.

Configuration 7

The attitude angle derivation device according to any one of Configurations 1 to 6, wherein
the processor supplies the updated attitude angle to the storage, and
the storage is configured to store the updated attitude angle.

Configuration 8

The attitude angle derivation device according to any one of Configurations 1 to 7, wherein
the rotation angle includes a first rotation angle related to a first axis, a second rotation angle related to a second axis, and a third rotation angle related to a third axis,
the second axis crosses the first axis, and
the third axis crosses a plane including the first and second axes.

Configuration 9

The attitude angle derivation device according to Configuration 8, wherein
the second axis is orthogonal to the first axis, and
the third axis is orthogonal to the first and second axes.

Configuration 10

The attitude angle derivation device according to Configuration 9, wherein
the rotation angle includes the first rotation angle $A_{x(t)}$ at a first time t, the second rotation angle $A_{y(t)}$ at the first time t, and the third rotation angle $A_{z(t)}$ at the first time t,
the processor derives a first temporal change $dA_{x(t)}$, a second temporal change $dA_{y(t)}$, and a third temporal change $dA_{z(t)}$ as the temporal change of the rotation angle, and
the first temporal change $dA_{x(t)}$, the second temporal change $dA_{y(t)}$, the third temporal change $dA_{z(t)}$, the first rotation angle $A_{x(t)}$, the second rotation angle $A_{y(t)}$, the third rotation angle $A_{z(t)}$, the first rotation angle $A_{x(t-1)}$ at a second time (t−1) before the first time t, the second rotation angle $A_{y(t-1)}$ at the second time (t−1), and the third rotation angle $A_{z(t-1)}$ at the second time (t−1) satisfy $$dA_{x(t)} = A_{x(t)} - A_{x(t-1)}$$

$$dA_{y(t)} = A_{y(t)} - A_{y(t-1)}$$

$$dA_{z(t)} = A_{z(t)} - A_{z(t-1)}. \quad (1)$$

Configuration 11

The attitude angle derivation device according to Configuration 10, wherein
the attitude angle includes:
a first attitude angle related to a first attitude axis;
a second attitude angle related to a second attitude axis; and
a third attitude angle related to a third attitude axis,
the second attitude axis crosses the first attitude axis, and
the third attitude axis crosses a plane including the first and second attitude axes.

Configuration 12

The attitude angle derivation device according to Configuration 11, wherein
the second attitude axis is orthogonal to the first attitude axis, and
the third attitude axis is orthogonal to the first and second attitude axes.

Configuration 13

The attitude angle derivation device according to Configuration 12, wherein
the attitude angle includes the first attitude angle $\phi_{(t-1)}$ at the second time (t−1), the second attitude angle $\theta_{(t-1)}$ at the second time (t−1), and the third attitude angle $\psi_{(t-1)}$ at the second time (t−1),
the processor derives a first attitude angle change $d\phi_{(t)}$, a second attitude angle change $d\theta_{(t)}$, and a third attitude angle change $d\psi_{(t)}$ as a change of the attitude angle, and
the first attitude angle change $d\phi_{(t)}$, the second attitude angle change $d\theta_{(t)}$, and the third attitude angle change $d\psi_{(t)}$ satisfy $$d\phi_{(t)} = (dA_{y(t)} \sin \phi_{(t-1)} + dA_{z(t)} \cos \phi_{(t-1)}) \tan \theta_{(t-1)} + dA_{x(t)}$$

$$d\theta_{(t)} = dA_{y(t)} \cos \phi_{(t-1)} - dA_{z(t)} \sin \phi_{(t-1)}$$

$$d\psi_{(t)} = (dA_{y(t)} \sin \phi + dA_{z(t)} \cos \phi)/\cos \theta_{(t-1)}. \quad (2)$$

Configuration 14

The attitude angle derivation device according to Configuration 13, wherein
the processor derives the first attitude angle $\phi_{(t)}$ at the first time t, the second attitude angle $\theta_{(t)}$ at the first time t, and the third attitude angle $\psi_{(t)}$ at the first time t as the updated attitude angle, and
the first attitude angle $\phi_{(t)}$ at the first time t, the second attitude angle $\theta_{(t)}$ at the first time t, and the third attitude angle $\psi_{(t)}$ at the first time t satisfy $$\phi_{(t)} = \phi_{(t-1)} + d\phi_{(t)}$$

$$\theta_{(t)} = \theta_{(t-1)} + d\theta_{(t)}$$

$$\psi_{(t)} = \psi_{(t-1)} + d\psi_{(t)}. \quad (3)$$

Configuration 15

The attitude angle derivation device according to Configuration 10, wherein
the attitude angle includes a first quaternion value, a second quaternion value, a third quaternion value, and a fourth quaternion value.

Configuration 16

The attitude angle derivation device according to Configuration 15, wherein
the attitude angle includes the first quaternion value $\alpha_{(t-1)}$ at the second time (t−1), the second quaternion value $\beta_{(t-1)}$ at the second time (t−1), the third quaternion value $\gamma_{(t-1)}$ at the second time (t−1), and the fourth quaternion value $\delta_{(t-1)}$ at the second time (t−1),
the processor derives a first quaternion value change $d\alpha_{(t)}$, a second quaternion value change $d\beta_{(t)}$, a third quaternion value change $d\gamma_{(t)}$, and a fourth quaternion value change $d\delta_{(t)}$ as a change of the attitude angle, and
the first quaternion value change $d\alpha_{(t)}$, the second quaternion value change $d\beta_{(t)}$, the third quaternion value change $d\gamma_{(t)}$, and the fourth quaternion value change $d\delta_{(t)}$ satisfy $$d\alpha_{(t)} = -0.5(\beta_{(t-1)} dA_{x(t)} + \gamma_{(t-1)} dA_{y(t)} + \delta_{(t-1)} dA_{z(t)})$$

$$d\beta_{(t)} = 0.5(\alpha_{(t-1)} dA_{x(t)} - \delta_{(t-1)} dA_{y(t)} + \gamma_{(t-1)} dA_{z(t)})$$

$$d\gamma_{(t)} = 0.5(\delta_{(t-1)} dA_{x(t)} + \alpha_{(t-1)} dA_{y(t)} - \beta_{(t-1)} dA_{z(t)})$$

$$d\delta_{(t)} = -0.5(\gamma_{(t-1)} dA_{x(t)} - \beta_{(t-1)} dA_{y(t)} - \alpha_{(t-1)} dA_{z(t)}). \quad (4)$$

Configuration 17

The attitude angle control device according to Configuration 16, wherein
the processor derives the first quaternion value $\alpha_{(t)}$ at the first time t, the second quaternion value $\beta_{(t)}$ at the first time t, the third quaternion value $\gamma_{(t)}$ at the first time t, and the fourth quaternion value $\delta_{(t)}$ at the first time t as the updated attitude angle, and
the first quaternion value $\alpha_{(t)}$ at the first time t, the second quaternion value $\beta_{(t)}$ at the first time t, the third quaternion value $\gamma_{(t)}$ at the first time t, and the fourth quaternion value $\delta_{(t)}$ at the first time t satisfy $$\alpha_{(t)} = \alpha_{(t-1)} + d\alpha_{(t)}$$

$$\beta_{(t)} = \beta_{(t-1)} + d\beta_{(t)}$$

$$\gamma_{(t)} = \gamma_{(t-1)} + d\gamma_{(t)}$$

$$\delta_{(t)} = \delta_{(t-1)} + d\delta_{(t)}. \quad (5)$$

Configuration 18

The attitude angle derivation device according to Configuration 17, wherein
the processor derives, as the updated attitude angle, the first attitude angle $\phi_{(t)}$ at the first time t, the second attitude angle $\theta_{(t)}$ at the first time t, and the third attitude angle $\psi_{(t)}$ at the first time t based on the first quaternion value $\alpha_{(t)}$ at the first time t, the second quaternion value $\beta_{(t)}$ at the first time t, the third quaternion value $\gamma_{(t)}$ at the first time t, and the fourth quaternion value $\delta_{(t)}$ at the first time t, and the first attitude angle $\phi_{(t)}$ at the first time t, the second attitude angle $\theta_{(t)}$ at the first time t, and the third attitude angle $\psi_{(t)}$ at the first time t satisfy $$\phi_{(t)} = \arctan\left(\frac{2(\gamma_{(t)}\delta_{(t)} + \alpha_{(t)}\beta_{(t)})}{\alpha_{(t)}^2 - \beta_{(t)}^2 - \gamma_{(t)}^2 + \delta_{(t)}^2}\right) \quad (6)$$
$$\theta_{(t)} = \arcsin(-2(\beta_{(t)}\delta_{(t)} - \alpha_{(t)}\gamma_{(t)}))$$
$$\psi_{(t)} = \arctan\left(\frac{2(\beta_{(t)}\gamma_{(t)} + \alpha_{(t)}\delta_{(t)})}{\alpha_{(t)}^2 + \beta_{(t)}^2 - \gamma_{(t)}^2 - \delta_{(t)}^2}\right)$$

Configuration 19

An attitude angle sensor, comprising:

the attitude angle derivation device according to any one of Configurations 1 to 18; and the angle sensor.

According to embodiments, an attitude angle derivation device and an attitude angle sensor capable of detecting attitude angles with high accuracy can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in attitude angle derivation devices and attitude angle sensors from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all attitude angle derivation devices, and attitude angle sensors practicable by an appropriate design modification by one skilled in the art based on the attitude angle derivation devices, and the attitude angle sensors described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An attitude angle derivation device, comprising:
an electronic interface configured to acquire a rotation angle related to a first coordinate system, the rotation angle being obtained from an angle sensor located in an object;
a memory configured to store the rotation angle and an attitude angle, the attitude angle being related to a second coordinate system of the object; and
a processor configured to acquire the rotation angle and the attitude angle by sampling including an irregular sampling, update the attitude angle based on a temporal change of the rotation angle derived from the rotation angle, and output the updated attitude angle via the electronic interface.

2. The device according to claim 1, wherein
the angle sensor includes an integrating gyroscope.

3. The device according to claim 1, wherein
the angle sensor includes a movable member,
the movable member can vibrate,
the vibration of the movable member includes:
a first component along a first direction; and
a second component along a second direction crossing the first direction, and
the angle sensor is configured to output, as the rotation angle, a rotation angle of the movable member obtained based on the first and second components.

4. The device according to claim 1, wherein,
the processor includes a first calculation part, and
the first calculation part is configured to derive the temporal change of the rotation angle.

5. The device according to claim 4, wherein
the processor further includes a second calculation part, and
the second calculation part is configured to derive a change of the attitude angle based on the temporal change derived by the first calculation part and based on the attitude angle acquired from the storage.

6. The device according to claim 5, wherein
the processor further includes a third calculation part, and
the third calculation part is configured to derive the updated attitude angle by adding:
the change of the attitude angle derived by the second calculation part; and
the attitude angle acquired from the storage.

7. The device according to claim 1, wherein
the processor supplies the updated attitude angle to the storage, and
the storage is configured to store the updated attitude angle.

8. The device according to claim 1, wherein
the rotation angle includes a first rotation angle related to a first axis, a second rotation angle related to a second axis, and a third rotation angle related to a third axis,
the second axis crosses the first axis, and
the third axis crosses a plane including the first and second axes.

9. The device according to claim 8, wherein
the second axis is orthogonal to the first axis, and
the third axis is orthogonal to the first and second axes.

10. The device according to claim 9, wherein
the rotation angle includes the first rotation angle $A_{x(t)}$ at a first time t, the second rotation angle $A_{y(t)}$ at the first time t, and the third rotation angle $A_{z(t)}$ at the first time t, the processor derives a first temporal change $dA_{x(t)}$, a second temporal change $dA_{y(t)}$, and a third temporal change $dA_{z(t)}$ as the temporal change of the rotation angle, and the first temporal change $dA_{x(t)}$, the second temporal change $dA_{y(t)}$, the third temporal change $dA_{z(t)}$, the first rotation angle $A_{x(t)}$, the second rotation angle $A_{y(t)}$, the third rotation angle $A_{z(t)}$, the first rotation angle $A_{x(t-1)}$ at a second time (t−1) before the first time t, the second rotation angle $A_{y(t-1)}$ at the second time (t−1), and the third rotation angle $A_{z(t-1)}$ at the second time (t−1) satisfy $$dA_{x(t)} = A_{x(t)} - A_{x(t-1)}$$

$$dA_{y(t)} = A_{y(t)} - A_{y(t-1)}$$

$$dA_{z(t)} = A_{z(t)} - A_{z(t-1)}. \qquad (1)$$

11. The device according to claim 10, wherein
the attitude angle includes:
 a first attitude angle related to a first attitude axis;
 a second attitude angle related to a second attitude axis; and
 a third attitude angle related to a third attitude axis,
the second attitude axis crosses the first attitude axis, and
the third attitude axis crosses a plane including the first and second attitude axes.

12. The device according to claim 11, wherein
the second attitude axis is orthogonal to the first attitude axis, and
the third attitude axis is orthogonal to the first and second attitude axes.

13. The device according to claim 12, wherein
the attitude angle includes the first attitude angle $\phi_{(t-1)}$ at the second time (t−1), the second attitude angle $\theta_{(t-1)}$ at the second time (t−1), and the third attitude angle $\psi_{(t-1)}$ at the second time (t−1), the processor derives a first attitude angle change $d\phi_{(t)}$, a second attitude angle change $d\theta_{(t)}$, and a third attitude angle change $d\psi_{(t)}$ as a change of the attitude angle, and the first attitude angle change $d\phi_{(t)}$, the second attitude angle change $d\theta_{(t)}$, and the third attitude angle change $d\psi_{(t)}$ satisfy $$d\phi_{(t)} = (dA_{y(t)} \sin \phi_{(t-1)} + dA_{x(t)} \cos \phi_{(t-1)}) \tan \theta_{(t-1)} + dA_{x(t)}$$

$$d\theta_{(t)} = dA_{y(t)} \cos \phi_{(t-1)} - dA_{x(t)} \sin \phi_{(t-1)}$$

$$d\psi_{(t)} = (dA_{y(t)} \sin \phi + dA_{x(t)} \cos \phi)/\cos \theta_{(t-1)}. \qquad (2)$$

14. The device according to claim 13, wherein
the processor derives the first attitude angle $\phi_{(t)}$ at the first time t, the second attitude angle $\theta_{(t)}$ at the first time t, and the third attitude angle $\psi_{(t)}$ at the first time t as the updated attitude angle, and the first attitude angle $\phi_{(t)}$ at the first time t, the second attitude angle $\theta_{(t)}$ at the first time t, and the third attitude angle $\psi_{(t)}$ at the first time t satisfy $$\phi_{(t)} = \phi_{(t-1)} + d\phi_{(t)}$$

$$\theta_{(t)} = \theta_{(t-1)} + d\theta_{(t)}$$

$$\psi_{(t)} = \psi_{(t-1)} + d\psi_{(t)}. \qquad (3)$$

15. The device according to claim 10, wherein
the attitude angle includes a first quaternion value, a second quaternion value, a third quaternion value, and a fourth quaternion value.

16. The device according to claim 15, wherein
the attitude angle includes the first quaternion value $\alpha_{(t-1)}$ at the second time (t−1), the second quaternion value $\beta_{(t-1)}$ at the second time (t−1), the third quaternion value $\gamma_{(t-1)}$ at the second time (t−1), and the fourth quaternion value $\delta_{(t-1)}$ at the second time (t−1), the processor derives a first quaternion value change $d\alpha_{(t)}$, a second quaternion value change $d\beta_{(t)}$, a third quaternion value change $d\gamma_{(t)}$, and a fourth quaternion value change $d\delta_{(t)}$ as a change of the attitude angle, and the first quaternion value change $d\alpha_{(t)}$, the second quaternion value change $d\beta_{(t)}$, the third quaternion value change $d\gamma_{(t)}$, and the fourth quaternion value change $d\delta_{(t)}$ satisfy $$d\alpha_{(t)} = -0.5(\beta_{(t-1)} dA_{x(t)} + \gamma_{(t-1)} dA_{y(t)} + \delta_{(t-1)} dA_{z(t)})$$

$$d\beta_{(t)} = 0.5(\alpha_{(t-1)} dA_{x(t)} - \delta_{(t-1)} dA_{y(t)} + \gamma_{(t-1)} dA_{z(t)})$$

$$d\gamma_{(t)} = 0.5(\delta d_{(t-1)} dA_{x(t)} + \alpha_{(t-1)} dA_{y(t)} - \beta_{(t-1)} dA_{z(t)})$$

$$d\delta_{(t)} = -0.5(\gamma_{(t-1)} dA_{x(t)} - \beta_{(t-1)} dA_{y(t)} - \alpha_{(t-1)} dA_{z(t)}). \qquad (4)$$

17. The device according to claim 16, wherein
the processor derives the first quaternion value $\alpha^{(t)}$ at the first time t, the second quaternion value $\beta_{(t)}$ at the first time t, the third quaternion value $\gamma_{(t)}$ at the first time t, and the fourth quaternion value $\delta_{(t)}$ at the first time t as the updated attitude angle, and the first quaternion value $\alpha_{(t)}$ at the first time t, the second quaternion value $\beta_{(t)}$ at the first time t, the third quaternion value $\gamma_{(t)}$ at the first time t, and the fourth quaternion value $\delta_{(t)}$ at the first time t satisfy $$\alpha_{(t)} = \alpha_{(t-1)} + d\alpha_{(t)}$$

$$\beta_{(t)} = \beta_{(t-1)} + d\beta_{(t)}$$

$$\gamma_{(t)} = \gamma_{(t-1)} + d\gamma_{(t)}$$

$$\delta_{(t)} = \delta_{(t-1)} + d\delta_{(t)} \qquad (5)$$

18. The device according to claim 17, wherein
the processor derives, as the updated attitude angle, the first attitude angle $\phi_{(t)}$ at the first time t, the second attitude angle $\theta_{(t)}$ at the first time t, and the third attitude angle $\psi_{(t)}$ at the first time t based on the first quaternion value $\alpha_{(t)}$ at the first time t, the second quaternion value $\beta_{(t)}$ at the first time t, the third quaternion value $\gamma_{(t)}$ at the first time t, and the fourth quaternion value $\delta_{(t)}$ at the first time t, and the first attitude angle $\phi_{(t)}$ at the first time t, the second attitude angle $\delta_{(t)}$ at the first time t, and the third attitude angle $\psi_{(t)}$ at the first time t satisfy $$\phi_{(t)} = \arctan\left(\frac{2(\gamma_{(t)}\delta_{(t)} + \alpha_{(t)}\beta_{(t)})}{\alpha_{(t)}^2 - \beta_{(t)}^2 - \gamma_{(t)}^2 + \delta_{(t)}^2}\right) \qquad (6)$$

$$\theta_{(t)} = \arcsin(-2(\beta_{(t)}\delta_{(t)} - \alpha_{(t)}\gamma_{(t)}))$$

$$\psi_{(t)} = \arctan\left(\frac{2(\beta_{(t)}\gamma_{(t)} + \alpha_{(t)}\delta_{(t)})}{\alpha_{(t)}^2 + \beta_{(t)}^2 - \gamma_{(t)}^2 - \delta_{(t)}^2}\right)$$

19. An attitude angle sensor, comprising:
the attitude angle derivation device according to claim 1; and
the angle sensor.

20. An attitude angle derivation device, comprising:
an electronic interface configured to acquire a rotation angle related to a first coordinate system, the rotation angle being obtained from an angle sensor located in an object by sampling including an irregular sampling;

a memory configured to store the rotation angle and an attitude angle, the attitude angle being related to a second coordinate system of the object; and a processor configured to acquire the rotation angle and the attitude angle, update the attitude angle based on a temporal change of the rotation angle derived from the rotation angle, and output the updated attitude angle via the electronic interface.

* * * * *